United States Patent
Nakai et al.

(10) Patent No.: US 11,524,741 B2
(45) Date of Patent: Dec. 13, 2022

(54) SENSOR WHEEL AND DISC BRAKE APPARATUS

(71) Applicant: SHIMANO INC., Sakai (JP)

(72) Inventors: Mototsugu Nakai, Sakai (JP); Kazuya Kuwayama, Sakai (JP); Ryosuke Habara, Sakai (JP)

(73) Assignee: SHIMANO INC., Sakai (JP)

(*) Notice: Subject to any disclaimer, the term of this patent is extended or adjusted under 35 U.S.C. 154(b) by 89 days.

(21) Appl. No.: 16/931,342

(22) Filed: Jul. 16, 2020

(65) Prior Publication Data

US 2022/0017175 A1    Jan. 20, 2022

(51) Int. Cl.
| | |
|---|---|
| *B62L 3/02* | (2006.01) |
| *B62J 45/423* | (2020.01) |
| *B62L 1/10* | (2006.01) |
| *B62L 1/00* | (2006.01) |

(52) U.S. Cl.
CPC ............ *B62J 45/423* (2020.02); *B62L 1/005* (2013.01); *B62L 1/10* (2013.01); *B62L 3/02* (2013.01); *B62L 3/023* (2013.01)

(58) Field of Classification Search
CPC .... B62L 3/00; B62L 3/02; B62L 3/023; B62L 1/005; B62L 1/10; B62J 45/423; G01P 1/026; G01P 3/481; G01P 3/488
See application file for complete search history.

(56) References Cited

U.S. PATENT DOCUMENTS

| | | | | | |
|---|---|---|---|---|---|
| 4,795,278 | A | * | 1/1989 | Hayashi | B60B 27/0068 310/155 |
| 6,131,547 | A | * | 10/2000 | Weber | F02D 41/0097 123/406.58 |
| 6,184,678 | B1 | * | 2/2001 | Kumamoto | G01P 3/487 310/168 |
| 6,392,405 | B1 | * | 5/2002 | Nishizaki | B21D 53/18 29/894 |
| 9,145,028 | B2 | * | 9/2015 | Mori | B62J 45/423 |
| 2004/0140166 | A1 | * | 7/2004 | Brown | B60T 8/329 188/218 XL |
| 2006/0054422 | A1 | * | 3/2006 | Dimsey | F16D 65/12 188/218 XL |
| 2015/0291250 | A1 | * | 10/2015 | Nagai | B62L 1/00 188/71.1 |

(Continued)

FOREIGN PATENT DOCUMENTS

| | | | |
|---|---|---|---|
| CN | 204659353 U | * | 9/2015 |
| CN | 204664357 U | * | 9/2015 |

(Continued)

*Primary Examiner* — Thomas J Williams
(74) *Attorney, Agent, or Firm* — Mori & Ward, LLP

(57) ABSTRACT

A sensor wheel for a human-powered vehicle comprises a wheel body and an attachment part. The wheel body is configured to be rotatable relative to a vehicle body of the human-powered vehicle about a rotational axis along with a rotational hub of the human-powered vehicle. The wheel body includes a plurality of openings spaced apart from each other in a circumferential direction with respect to the rotational axis. The attachment part is configured to be operatively coupled to the rotational hub. At least one opening of the plurality of openings has a radial length defined radially with respect to the rotational axis. The radial length is equal to or larger than 8 mm.

18 Claims, 7 Drawing Sheets

(56) References Cited

U.S. PATENT DOCUMENTS

2017/0151833 A1\* 6/2017 Neutsch ................ B62L 3/023
2018/0333985 A1\* 11/2018 Ruopp ................... G01P 3/488
2022/0017175 A1\* 1/2022 Nakai ................... B62J 45/413

FOREIGN PATENT DOCUMENTS

| EP | 1580109 A1 | \* | 9/2005 | ............. B62J 99/00 |
|---|---|---|---|---|
| JP | 2009067161 A | \* | 4/2009 | |
| JP | 2011213232 A | \* | 10/2011 | |
| JP | 2012141184 A | \* | 7/2012 | |
| JP | 2013224051 A | \* | 10/2013 | |
| JP | 2017223267 A | \* | 12/2017 | |

\* cited by examiner

SENSOR WHEEL AND DISC BRAKE APPARATUS

BACKGROUND OF THE INVENTION

Field of the Invention

The present invention relates to a sensor wheel and a disc brake apparatus.

Discussion of the Background

A human-powered vehicle includes a wheel member configured to be sensed by a rotation sensor.

SUMMARY OF THE INVENTION

In accordance with a first aspect of the present invention, a sensor wheel for a human-powered vehicle comprises a wheel body and an attachment part. The wheel body is configured to be rotatable relative to a vehicle body of the human-powered vehicle about a rotational axis along with a rotational hub of the human-powered vehicle. The wheel body includes a plurality of openings spaced apart from each other in a circumferential direction with respect to the rotational axis. The attachment part is configured to be operatively coupled to the rotational hub. At least one opening of the plurality of openings has a radial length defined radially with respect to the rotational axis. The radial length is equal to or larger than 8 mm.

With the sensor wheel according to the first aspect, the radial length enlarges a radial area in which a detector can be arranged to detect rotation information of the sensor wheel. Thus, it is possible to improve flexibility with respect to a relative position between the sensor wheel and the detector, enabling the sensor wheel to be used for human-powered vehicles having different radial positions of the detector with respect to the rotational axis.

In accordance with a second aspect of the present invention, a sensor wheel for a human-powered vehicle comprises a wheel body and an attachment part. The wheel body is configured to be rotatable relative to a vehicle body of the human-powered vehicle about a rotational axis along with a disc brake rotor of a disc brake apparatus of the human-powered vehicle. The wheel body includes a plurality of openings spaced apart from each other in a circumferential direction with respect to the rotational axis. The attachment part is configured to be operatively coupled to a rotational hub of the human-powered vehicle. At least one opening of the plurality of openings has a radial length defined radially with respect to the rotational axis. The disc brake rotor includes a friction surface configured to be in contact with a brake pad of a disc brake caliper of the disc brake apparatus. The radial length is larger than a radial width of the friction surface defined radially with respect to the rotational axis.

With the sensor wheel according to the second aspect, the radial length enlarges a radial area in which a detector can be arranged to detect rotation information of the sensor wheel. Thus, it is possible to improve flexibility with respect to a relative position between the sensor wheel and the detector, enabling the sensor wheel to be used for human-powered vehicles having different radial positions of the detector with respect to the rotational axis.

In accordance with a third aspect of the present invention, the sensor wheel according to the second aspect is configured so that the radial length is equal to or larger than 8 mm.

With the sensor wheel according to the third aspect, the radial length reliably enlarges a radial area in which a detector can be arranged to detect rotation information of the sensor wheel.

In accordance with a fourth aspect of the present invention, a sensor wheel for a human-powered vehicle comprises a wheel body and an attachment part. The wheel body is configured to be rotatable relative to a vehicle body of the human-powered vehicle about a rotational axis along with a rotational hub of the human-powered vehicle. The wheel body includes a plurality of openings spaced apart from each other in a circumferential direction with respect to the rotational axis. The attachment part is configured to be operatively coupled to the rotational hub. At least one opening of the plurality of openings has a radial length defined radially with respect to the rotational axis. The at least one opening of the plurality of openings has a circumferential length defined in the circumferential direction. A ratio of the radial length to the circumferential length is equal to or larger than 4.

With the sensor wheel according to the fourth aspect, the radial length enlarges a radial area in which a detector can be arranged to detect rotation information of the sensor wheel. Thus, it is possible to improve flexibility with respect to a relative position between the sensor wheel and the detector, enabling the sensor wheel to be used for human-powered vehicles having different radial positions of the detector with respect to the rotational axis.

In accordance with a fifth aspect of the present invention, the sensor wheel according to the fourth aspect is configured so that the radial length is equal to or larger than 8 mm.

With the sensor wheel according to the fifth aspect, the radial length reliably enlarges a radial area in which a detector can be arranged to detect rotation information of the sensor wheel.

In accordance with a sixth aspect of the present invention, the sensor wheel according to the fourth aspect is configured so that the wheel body is configured to be rotatable about the rotational axis along with a disc brake rotor of a disc brake apparatus of the human-powered vehicle. The disc brake rotor includes a friction surface configured to be in contact with a brake pad of a disc brake caliper of the disc brake apparatus. The radial length is larger than a radial width of the friction surface defined radially with respect to the rotational axis.

With the sensor wheel according to the sixth aspect, the radial length reliably enlarges a radial area in which a detector can be arranged to detect rotation information of the sensor wheel.

In accordance with a seventh aspect of the present invention, the sensor wheel according to any one of the fourth to sixth aspects is configured so that the ratio of the radial length to the circumferential length is equal to or larger than 6.

With the sensor wheel according to the seventh aspect, the radial length reliably enlarges a radial area in which a detector can be arranged to detect rotation information of the sensor wheel.

In accordance with an eighth aspect of the present invention, the sensor wheel according to any one of the fourth to seventh aspects is configured so that the circumferential length is defined at a radially inner end of the at least one opening of the plurality of openings.

With the sensor wheel according to the eighth aspect, the radial length reliably enlarges a radial area in which a detector can be arranged to detect rotation information of the sensor wheel.

In accordance with a ninth aspect of the present invention, the sensor wheel according to any one of the first to eighth aspects is configured so that the radial length is equal to or larger than 12 mm.

With the sensor wheel according to the ninth aspect, the radial length reliably enlarges a radial area in which a detector can be arranged to detect rotation information of the sensor wheel.

In accordance with a tenth aspect of the present invention, the sensor wheel according to any one of the first to ninth aspects is configured so that the radial length is equal to or larger than 15.5 mm.

With the sensor wheel according to the tenth aspect, the radial length reliably enlarges a radial area in which a detector can be arranged to detect rotation information of the sensor wheel.

In accordance with an eleventh aspect of the present invention, the sensor wheel according to any one of the first to tenth aspects is configured so that the at least one opening of the plurality of openings has an elongated shape extending radially with respect to the rotational axis as viewed along the rotational axis.

With the sensor wheel according to the eleventh aspect, the radial length reliably enlarges a radial area in which a detector can be arranged to detect rotation information of the sensor wheel.

In accordance with a twelfth aspect of the present invention, the sensor wheel according to any one of the first to eleventh aspects is configured so that the at least one opening of the plurality of openings has a longitudinal axis extending radially with respect to the rotational axis as viewed along the rotational axis.

With the sensor wheel according to the twelfth aspect, the radial length reliably enlarges a radial area in which a detector can be arranged to detect rotation information of the sensor wheel.

In accordance with a thirteenth aspect of the present invention, the sensor wheel according to the twelfth aspect is configured so that the longitudinal axis of the at least one opening of the plurality of openings extends radially outwardly from the rotational axis as viewed along the rotational axis.

With the sensor wheel according to the thirteenth aspect, the radial length more reliably enlarges a radial area in which a detector can be arranged to detect rotation information of the sensor wheel.

In accordance with a fourteenth aspect of the present invention, the sensor wheel according to the twelfth or thirteenth aspect is configured so that the radial length is defined along the longitudinal axis.

With the sensor wheel according to the fourteenth aspect, the radial length more reliably enlarges a radial area in which a detector can be arranged to detect rotation information of the sensor wheel.

In accordance with a fifteenth aspect of the present invention, the sensor wheel according to any one of the first to fourteenth aspects is configured so that the wheel body has an annular shape and includes an inner periphery. The attachment part is provided to the inner periphery of the wheel body.

With the sensor wheel according to the fifteenth aspect, it is possible to mount the sensor wheel to another component with a comparatively simple structure.

In accordance with a sixteenth aspect of the present invention, the sensor wheel according to any one of the first to fifteenth aspects is configured so that the attachment part has a concavo-convex shape configured to be engaged with the rotational hub.

With the sensor wheel according to the sixteenth aspect, it is possible to mount the sensor wheel to another component with a comparatively simple structure.

In accordance with a seventeenth aspect of the present invention, the sensor wheel according to any one of the first to sixteenth aspects is configured so that the wheel body includes an outer periphery. The wheel body has an outer radial width defined radially from the outer periphery of the wheel body to the at least one opening of the plurality of openings. The at least one opening of the plurality of openings has an outer circumferential length defined in the circumferential direction at a radially outer end of the at least one opening of the plurality of openings. The outer circumferential length is larger than the outer radial width of the wheel body.

With the sensor wheel according to the seventeenth aspect, it is possible to reliably enlarge the radial area in which the detector can be arranged to detect the rotation information of the sensor wheel.

In accordance with an eighteenth aspect of the present invention, the sensor wheel according to any one of the first to seventeenth aspects is configured so that the wheel body has a radius radially defined from the rotational axis to an outer periphery of the wheel body. A ratio of the radial length to the radius of the wheel body is equal to or larger than 0.2.

With the sensor wheel according to the eighteenth aspect, it is possible to reliably enlarge the radial area in which the detector can be arranged to detect the rotation information of the sensor wheel.

In accordance with a nineteenth aspect of the present invention, a disc brake apparatus for a human-powered vehicle comprises a disc brake rotor and the sensor wheel according to any one of the first to eighteenth aspects.

With the sensor wheel according to the nineteenth aspect, it is possible to utilize the disc brake apparatus to arrange the sensor wheel.

In accordance with a twentieth aspect of the present invention, the sensor wheel according to the nineteenth aspect further comprises a detector configured to detect passing of the plurality of openings.

With the sensor wheel according to the twentieth aspect, it is possible to detect rotation information of the sensor wheel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
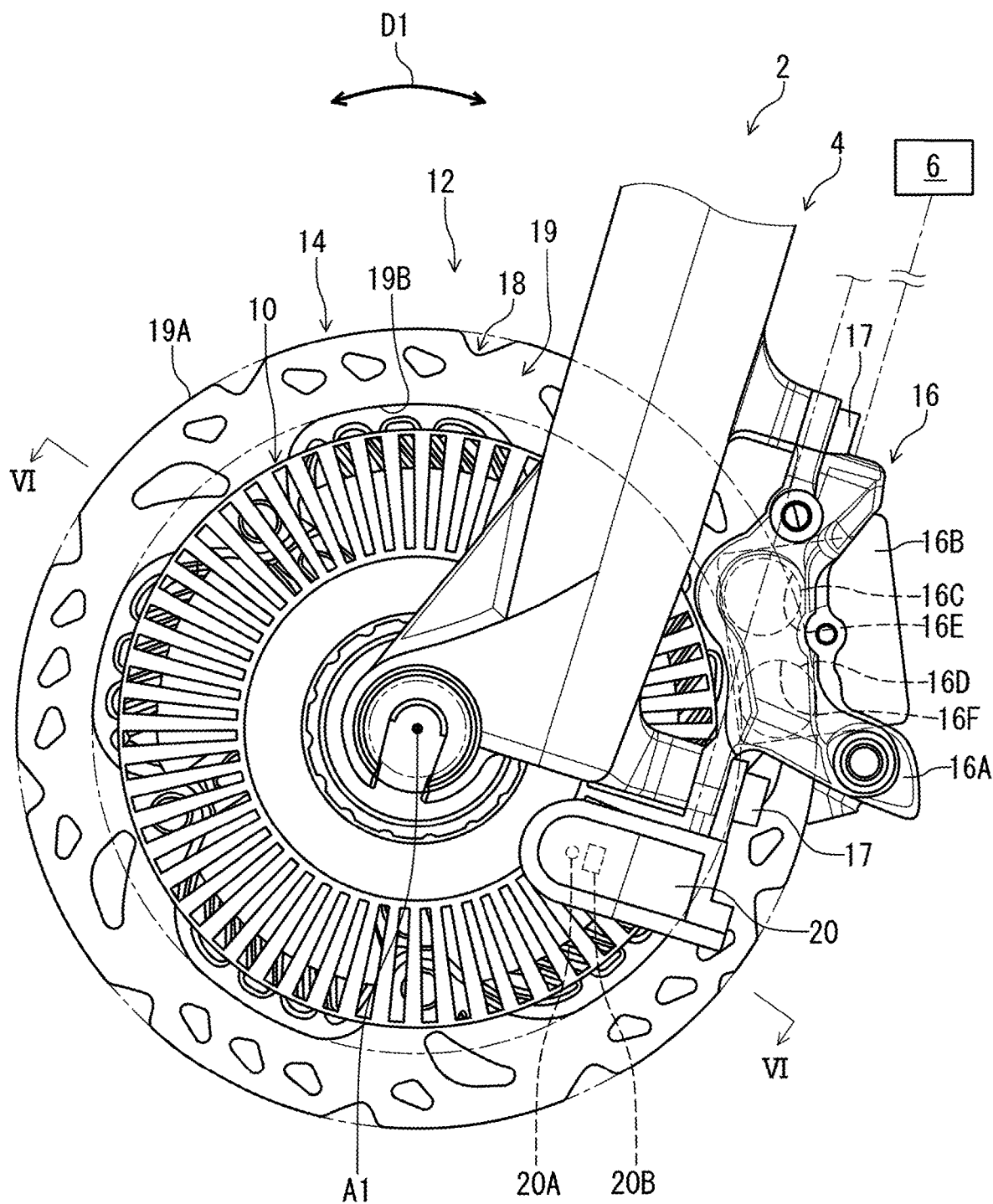
FIG. 1 is a side elevational view of a human-powered vehicle including a disc brake apparatus having a sensor wheel in accordance with an embodiment.

The embodiment(s) will now be described with reference to the accompanying drawings, wherein like reference numerals designate corresponding or identical elements throughout the various drawings.

As seen in FIG. 1, a human-powered vehicle 2 includes a sensor wheel 10. For example, the human-powered vehicle 2 is a vehicle to travel with a motive power including at least human power of a user (i.e., rider) who rides the human-powered vehicle 2. The human-powered vehicle 2 includes at least one wheel. In the present disclosure, the human-powered vehicle 2 preferably has a smaller size than that of a four-wheeled automobile. However, the human-powered vehicle 2 can have an arbitrary size. For example, the human-powered vehicle 2 can have a larger size than that of the four-wheeled automobile. Examples of the human-powered vehicle 2 include a bicycle and a kick scooter. In the present disclosure, the human-powered vehicle 2 includes a bicycle. An electric assisting system including an electric motor can be applied to the human-powered vehicle 2 (e.g., the bicycle) to assist muscular motive power of the user. Namely, the human-powered vehicle 2 can be an E-bike. Furthermore, an anti-lock braking system (ABS) can be applied to the human-powered vehicle 2.

In the present embodiment, the human-powered vehicle 2 includes a vehicle body 4 and a disc brake apparatus 12. The disc brake apparatus 12 for the human-powered vehicle 2 comprises a disc brake rotor 14 and the sensor wheel 10. The disc brake rotor 14 is configured to be rotatable relative to the vehicle body 4 along with a wheel 3 of the human-powered vehicle 2 about a rotational axis A1. The sensor wheel 10 is configured to be rotatable relative to the vehicle body 4 along with the wheel 3 about the rotational axis A1.

In the present embodiment, the disc brake apparatus 12 and the sensor wheel 10 are configured to be mounted to a front fork of the vehicle body 4. However, the disc brake apparatus 12 and the sensor wheel 10 can be configured to be mounted to other parts (e.g., a seat stay, a chain stay) of the vehicle body 4.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or steering. Accordingly, these terms, as utilized to describe the disc brake apparatus 12, the sensor wheel 10 or other components, should be interpreted relative to the human-powered vehicle 2 equipped with the disc brake apparatus 12 and the sensor wheel 10 as used in an upright riding position on a horizontal surface.

The disc brake apparatus 12 includes a disc brake caliper 16 configured to apply braking force to the disc brake caliper 16 in response to an operation of an operating device 6. The disc brake caliper 16 is configured to be mounted to the vehicle body 4 with fasteners 17. In the present embodiment, the disc brake caliper 16 is a hydraulic disc brake caliper, and the operating device 6 includes a hydraulic unit configured to generate hydraulic pressure. However, the disc brake caliper 16 is not limited to the hydraulic disc brake caliper.

For example, the disc brake caliper 16 includes a caliper body 16A, a pair of brake pads 16B, and a pair of first pistons 16C, and a pair of second piston 16D. The caliper body 16A includes a pair of first recesses 16E and a pair of second recesses 16F. The first piston 16C is movably provided in the first recess 16E. The second piston 16D is movably provided in the second recess 16F.

The disc brake rotor 14 includes a friction member 18. The friction member 18 is provided between the pair of brake pads 16B to be contactable with the pair of brake pads 16B. The pair of brake pads 16B is provided between the pair of first pistons 16C. The pair of brake pads 16B is provided between the pair of second pistons 16D. The first piston 16C and the second piston 16D are configured to push the brake pad 16B toward the radially outer portion of the disc brake rotor 14 in response to increase in hydraulic pressure supplied from the operating device 6.

The disc brake rotor 14 includes a friction surface 19. The friction member 18 includes a pair of friction surfaces 19. The friction surface 19 is configured to be in contact with the brake pad 16B of the disc brake caliper 16 of the disc brake apparatus 12. The friction surface 19 has an annular shape.

The disc brake apparatus 12 further comprises a detector 20. The detector 20 is configured to be mounted to the vehicle body 4 with the fastener 17. The detector 20 is configured to detect rotation information of the sensor wheel 10. For example, the detector 20 is configured to detect a rotational speed of the sensor wheel 10. The rotational information detected by the detector 20 can be used for displaying the rotational information, control of the ABS, control of a braking device, control of a gear-changing device, or other control of the human-powered vehicle 2.

Figure 2:
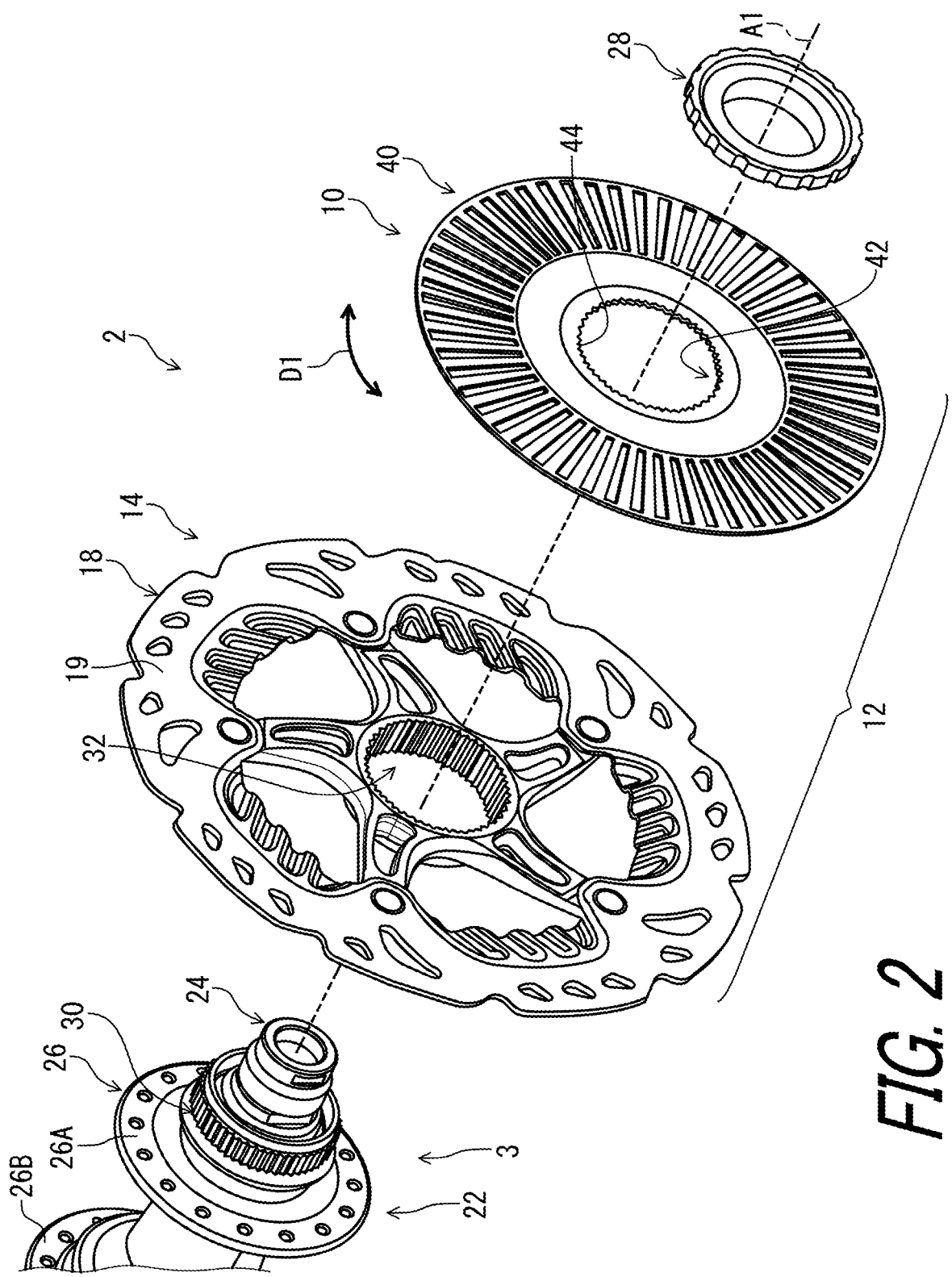
FIG. 2 is an exploded perspective view of the disc brake apparatus of the human-powered vehicle illustrated in FIG. 1.

As seen in FIG. 2, the wheel 3 of the human-powered vehicle 2 includes a hub assembly 22. Namely, the human-powered vehicle 2 includes the hub assembly 22. The hub assembly 22 includes a hub axle 24 and a rotational hub 26. The hub axle 24 is configured to be secured to the vehicle body 4. The rotational hub 26 is configured to be rotatably mounted to the hub axle 24 about the rotational axis A1. The rotational hub 26 includes spoke attachment parts 26A and 26B. The spoke attachment parts 26A and 26B are coupled to a rim of the wheel 3 with a plurality of spokes. The rotational hub 26 is configured to be rotatable relative to the vehicle body 4 along with the rim of the wheel 3 about the rotational axis A1.

The disc brake rotor 14 and the sensor wheel 10 are configured to be operatively coupled to the rotational hub 26. The disc brake apparatus 12 includes a lock member 28 configured to be detachably attached to the rotational hub 26. The disc brake rotor 14 and the sensor wheel 10 are configured to be secured to the rotational hub 26 with the lock member 28. Thus, the disc brake rotor 14 and the sensor wheel 10 are rotatable along with the rotational hub 26 of the hub assembly 22 of the wheel 3 about the rotational axis A1.

The rotational hub 26 includes an external engagement structure 30. The disc brake rotor 14 includes an internal engagement structure 32 configured to be coupled to the external engagement structure 30 of the rotational hub 26. In the present embodiment, the external engagement structure 30 of the rotational hub 26 has a concavo-convex shape. The internal engagement structure 32 of the disc brake rotor 14 has a concavo-convex shape. For example, the external engagement structure 30 of the rotational hub 26 includes a plurality of external teeth constituting a serration. The internal engagement structure 32 of the disc brake rotor 14 includes a plurality of internal teeth constituting a serration. The plurality of internal teeth of the internal engagement structure 32 is configured to mesh with the plurality of external teeth of the external engagement structure 30. However, the external engagement structure 30 of the rotational hub 26 can have structures other than the plurality of external teeth. The internal engagement structure 32 of the disc brake rotor 14 can have structures other than the plurality of internal teeth.

The sensor wheel 10 for the human-powered vehicle 2 comprises a wheel body 40 and an attachment part 42. The wheel body 40 is configured to be rotatable relative to the vehicle body 4 (see, e.g., FIG. 1) of the human-powered vehicle 2 about the rotational axis A1 along with the rotational hub 26 of the human-powered vehicle 2.

In the present embodiment, the wheel body 40 is configured to be rotatable about the rotational axis A1 along with the disc brake rotor 14 of the disc brake apparatus 12 of the human-powered vehicle 2. The wheel body 40 is configured to be rotatable relative to the vehicle body 4 of the human-powered vehicle 2 about the rotational axis A1 along with the disc brake rotor 14 of the disc brake apparatus 12 of the human-powered vehicle 2. The wheel body 40 is free of a friction surface configured to be contactable with the brake pad 16B of the disc brake caliper 16.

The attachment part 42 is configured to be operatively coupled to the rotational hub 26 of the human-powered vehicle 2. The wheel body 40 has an annular shape and includes an inner periphery 44. The attachment part 42 is provided to the inner periphery 44 of the wheel body 40. In the present embodiment, the attachment part 42 has a concavo-convex shape configured to be engaged with the rotational hub 26. The attachment part 42 includes a plurality of internal attachment teeth constituting a serration. The plurality of internal attachment teeth of the attachment part 42 is configured to mesh with the plurality of external teeth of the external engagement structure 30 of the rotational hub 26. However, the attachment part 42 can have structures other than the plurality of internal attachment teeth. Instead of or in addition to the plurality of internal attachment teeth, for example, the attachment part 42 can include at least one attachment opening through which at least one fastener is to extend.

In the present embodiment, the attachment part 42 is configured to be directly coupled to the rotational hub 26. However, the attachment part 42 can be configured to be indirectly coupled to the rotational hub 26 if needed and/or desired. For example, the attachment part 42 can be configured to be coupled to the disc brake rotor 14 directly mounted to the rotational hub 26. Furthermore, the disc brake rotor 14 can be omitted from the human-powered vehicle 2 if needed and/or desired.

Furthermore, the human-powered vehicle 2 includes the disc brake apparatus 12 having the sensor wheel 10. However, the human-powered vehicle 2 can have other brake apparatuses other than the disc brake apparatus 12. The sensor wheel 10 can be mounted to the rotational hub 26 without another device.

In the present embodiment, the attachment part 42 is integrally provided with the wheel body 40 as a one-piece unitary member. The wheel body 40 and the attachment part 42 are made of a metallic material. The sensor wheel 10 is a separate member from the disc brake rotor 14. However, the attachment part 42 can be a separate member from the wheel body 40. At least one of the wheel body 40 and the attachment part 42 can be made of a non-metallic material. The sensor wheel 10 can be integrally provided with at least part of the disc brake rotor 14 or other members as a one-piece unitary member.

Figure 3:
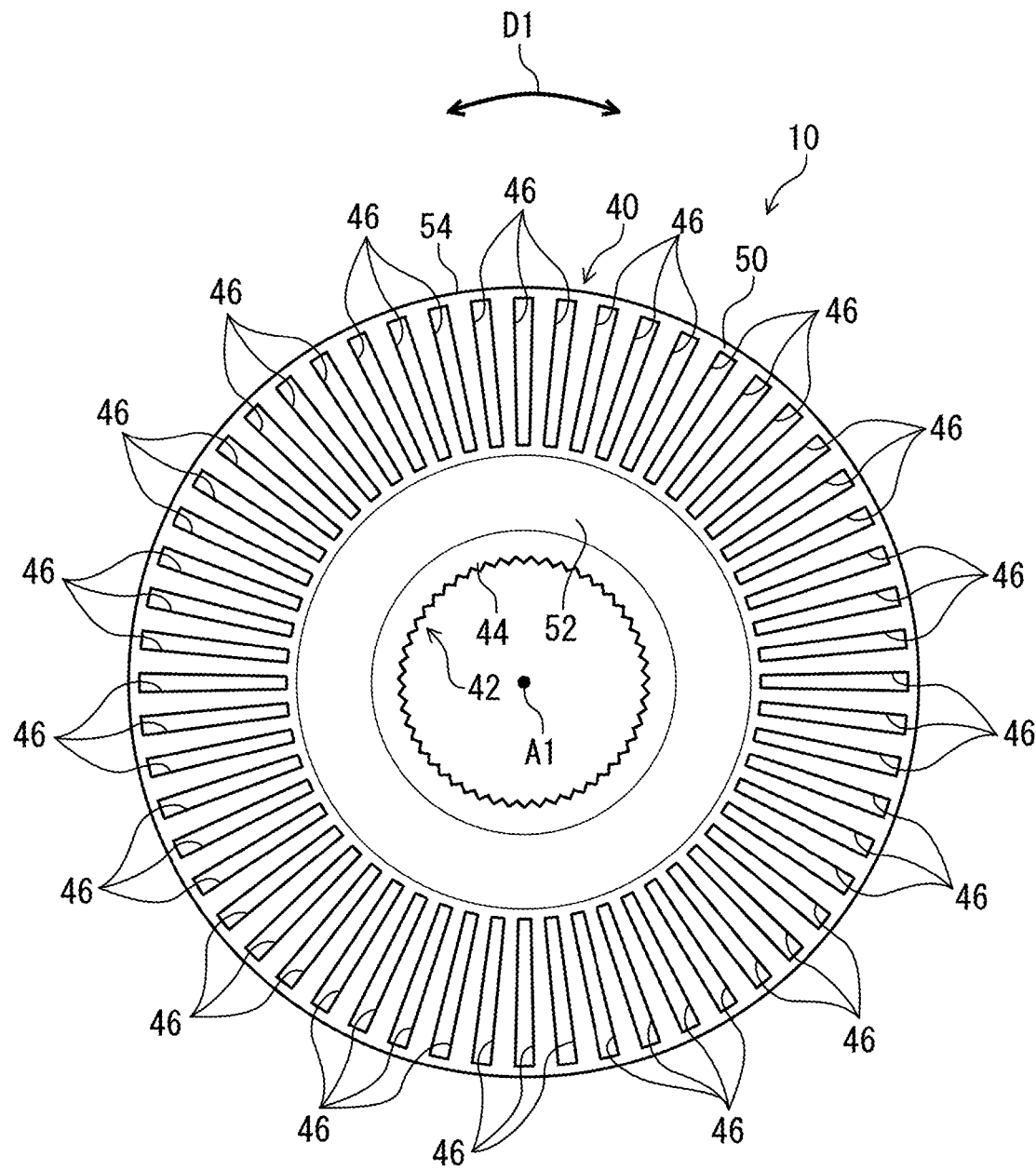
FIG. 3 is a side elevational view of the sensor wheel of the human-powered vehicle illustrated in FIG. 1.

As seen in FIG. 3, the wheel body 40 includes a plurality of openings 46 spaced apart from each other in a circumferential direction D1 with respect to the rotational axis A1. The at least one opening of the plurality of openings 46 has an elongated shape extending radially with respect to the rotational axis A1 as viewed along the rotational axis A1. In the present embodiment, each of the plurality of openings 46 has the elongated shape extending radially with respect to the rotational axis A1 as viewed along the rotational axis A1. Each of the plurality of openings 46 has an elongated shape linearly extending as viewed along the rotational axis A1. The plurality of openings 46 has the same shape as each other. The openings 46 are arranged at regular intervals in the circumferential direction D1. However, at least one opening of the plurality of openings 46 can have a shape different from another opening of the plurality of openings 46 if needed and/or desired.

Figure 4:
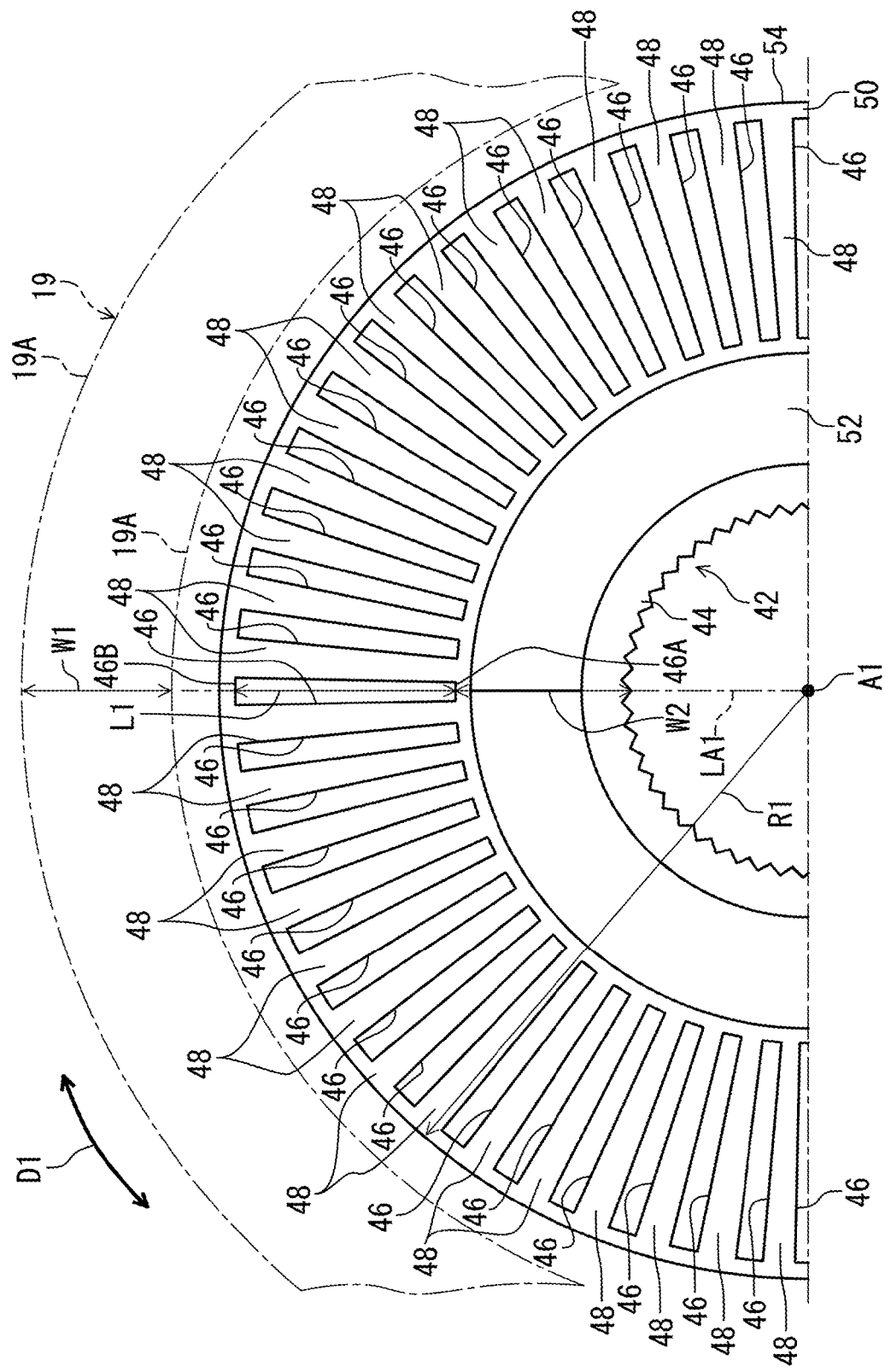
FIG. 4 is a partial side elevational view of the sensor wheel of the human-powered vehicle illustrated in FIG. 1.

As seen in FIG. 4, the wheel body 40 includes a plurality of intermediate parts 48 each provided between adjacent two openings 46 of the plurality of openings 46 in the circumferential direction D1. Each of the plurality of intermediate parts 48 has an elongated shape extending radially with respect to the rotational axis A1 as viewed along the rotational axis A1.

The wheel body 40 includes an outer ring part 50 and an inner ring part 52. The outer ring part 50 is provided radially outward of the inner ring part 52 with respect to the rotational axis A1. The outer ring part 50 is radially spaced apart from the inner ring part 52 with respect to the rotational axis A1. The plurality of openings 46 and the plurality of intermediate parts 48 are provided radially between the outer ring part 50 and the inner ring part 52. The plurality of openings 46 radially extend from the outer ring part 50 to the inner ring part 52. The plurality of intermediate parts 48 radially extends from the outer ring part 50 to the inner ring part 52. The plurality of intermediate parts 48 couples the outer ring part 50 to the inner ring part 52. The inner ring part 52 includes the inner periphery 44. Thus, the attachment part 42 is provided to the inner periphery 44 of the inner ring part 52. The plurality of intermediate parts 48, the outer ring part 50, and the inner ring part 52 define the plurality of openings 46.

At least one opening of the plurality of openings 46 has a radial length L1 defined radially with respect to the rotational axis A1. The at least one opening of the plurality of openings 46 has a longitudinal axis LA1 extending radially with respect to the rotational axis A1 as viewed along the rotational axis A1. The longitudinal axis LA1 of the at least one opening of the plurality of openings 46 extends radially outwardly from the rotational axis A1 as viewed along the rotational axis A1.

In the present embodiment, each of the plurality of openings 46 has the longitudinal axis LA1 extending radially with respect to the rotational axis A1 as viewed along the rotational axis A1. The longitudinal axis LA1 of each of the plurality of openings 46 extends radially outwardly from the rotational axis A1 as viewed along the rotational axis A1. The radial length L1 is defined along the longitudinal axis LA1. However, the longitudinal axis LA1 of the at least one opening of the plurality of openings 46 can be inclined by being offset from the rotational axis A1 as viewed along the rotational axis A1.

Each of the openings 46 includes a radially inner end 46A and a radially outer end 46B provided radially outward of the radially inner end 46A. The opening 46 extends radially outward from the radially inner end 46A to the radially outer end 46B along the longitudinal axis LA1.

The radial length L1 is equal to or larger than 8 mm. The radial length L1 is equal to or larger than 12 mm. The radial length L1 is preferably equal to or larger than 15.5 mm. The radial length L1 is preferably equal to or larger than 20 mm. In the present embodiment, the radial length L1 is 22.5 mm. However, the radial length L1 is not limited to the present embodiment and the above ranges. The radial length L1 can be smaller than 8 mm if needed and/or desired.

The radial length L1 is larger than a radial width W1 of the friction surface 19 defined radially with respect to the rotational axis A1. The friction surface 19 includes a radially outermost end 19A and a radially innermost end 19B. The friction surface 19 is defined radially from the radially outermost end 19A to the radially innermost end 19B. The friction surface 19 is provided radially outward of the plurality of openings 46. However, the radial length L1 can be equal to or smaller than the radial width W1 of the friction surface 19 if needed and/or desired.

The wheel body 40 includes an outer periphery 54. The wheel body 40 has a radius R1 radially defined from the rotational axis A1 to the outer periphery 54 of the wheel body 40. The radial length L1 is smaller than the radius R1 of the wheel body 40. A ratio of the radial length L1 to the radius R1 of the wheel body 40 is equal to or larger than 0.2. The ratio of the radial length L1 to the radius R1 of the wheel body 40 is preferably equal to or larger than 0.3. The ratio of the radial length L1 to the radius R1 of the wheel body 40 is more preferably equal to or larger than 0.35. The ratio of the radial length L1 to the radius R1 of the wheel body 40 is equal to or smaller than 1. The ratio of the radial length L1 to the radius R1 of the wheel body 40 is preferably smaller than 0.6. However, the ratio of the radial length L1 to the radius R1 of the wheel body 40 is not limited to the present embodiment and the above ranges. The ratio of the radial length L1 to the radius R1 of the wheel body 40 can be smaller than 0.2 if needed and/or desired. The ratio of the radial length L1 to the radius R1 of the wheel body 40 can be equal to or larger than 0.6 if needed and/or desired.

Figure 5:
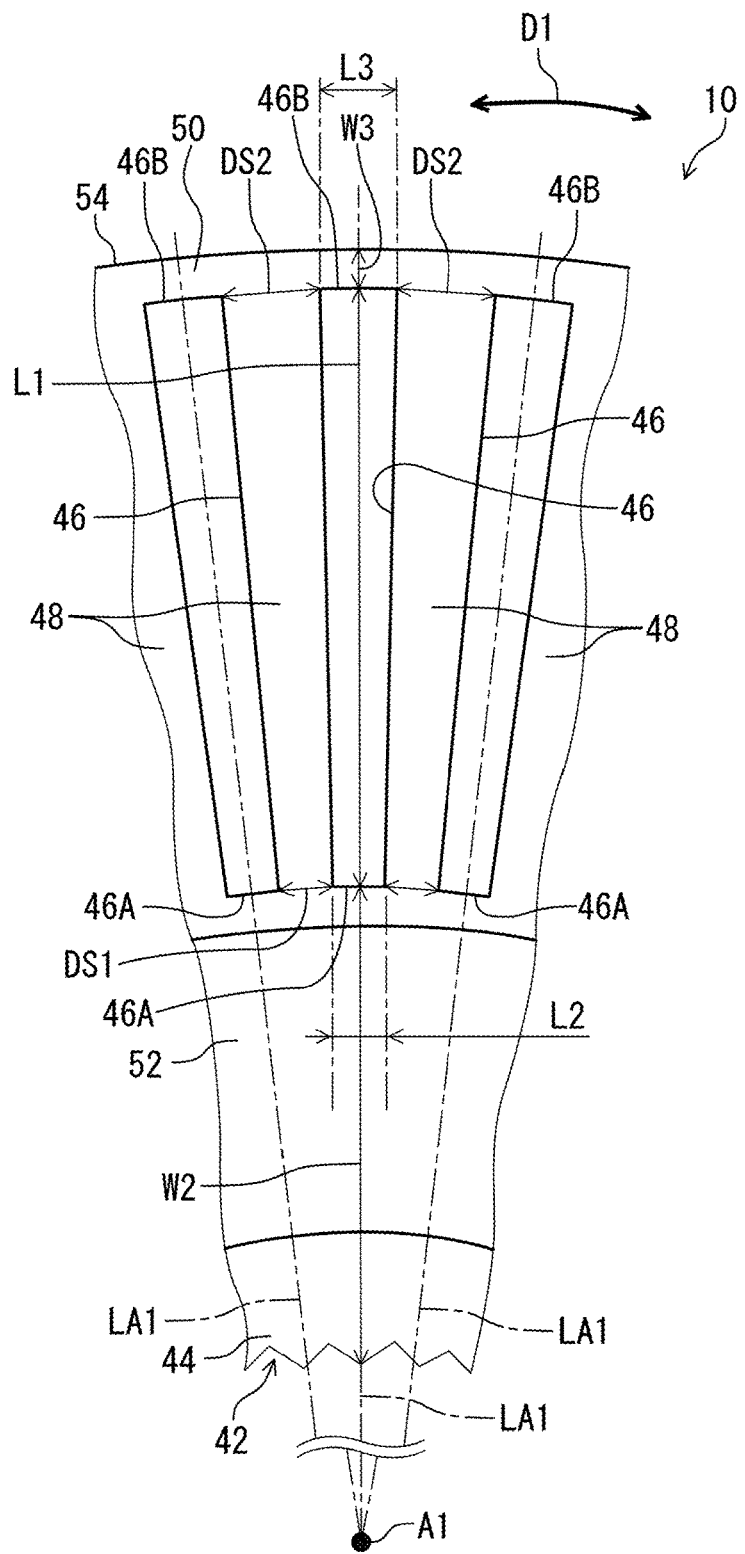
FIG. 5 is an enlarged partial side elevational view of the sensor wheel of the human-powered vehicle illustrated in FIG. 1.

As seen in FIG. 5, the at least one opening of the plurality of openings 46 has a circumferential length L2 defined in the circumferential direction D1. The circumferential length L2 is defined at the radially inner end 46A of the at least one opening of the plurality of openings 46. Each of the plurality of openings 46 has a circumferential length L2 defined in the circumferential direction D1. The circumferential length L2 is defined at a radially inner end 46A of each of the plurality of openings 46. Thus, the circumferential length L2 can also be referred to as an inner circumferential length L2.

The radial length L1 is larger than the circumferential length L2. A ratio of the radial length L1 to the circumferential length L2 is equal to or larger than 4. The ratio of the radial length L1 to the circumferential length L2 is preferably equal to or larger than 5. The ratio of the radial length L1 to the circumferential length L2 is preferably equal to or larger than 6. The ratio of the radial length L1 to the circumferential length L2 is preferably equal to or larger than 7. In the present embodiment, the ratio of the radial length L1 to the circumferential length L2 is 11.94. However, the ratio of the radial length L1 to the circumferential length L2 is not limited to the present embodiment and the above ranges. The ratio of the radial length L1 to the circumferential length L2 can be smaller than 4 if needed and/or desired. The circumferential length L2 can be defined at a position other than the radially inner end 46A of each of the plurality of openings 46 if needed and/or desired.

The wheel body 40 has an inner radial width W2 defined radially from the inner periphery 44 of the wheel body 40 to the at least one opening of the plurality of openings 46. The inner ring part 52 has the inner radial width W2. The inner ring part 52 has the inner radial width W2. In the present embodiment, the radial length L1 is larger than the inner radial width W2. The inner circumferential length L2 is smaller than the inner radial width W2 of the wheel body 40. However, the radial length L1 can be equal to or smaller than the inner radial width W2 if needed and/or desired. The inner circumferential length L2 can be equal to or larger than the inner radial width W2 of the wheel body 40 if needed and/or desired.

The wheel body 40 has an outer radial width W3 defined radially from the outer periphery 54 of the wheel body 40 to the at least one opening of the plurality of openings 46. The outer ring part 50 has the outer radial width W3. The at least one opening of the plurality of openings 46 has an outer circumferential length L3 defined in the circumferential direction D1 at the radially outer end 46B of the at least one opening of the plurality of openings 46.

In the present embodiment, the outer circumferential length L3 is larger than the outer radial width W3 of the wheel body 40. The radial length L1 is larger than the outer circumferential length L3. The outer circumferential length L3 is larger than the inner circumferential length L2. The radial length L1 is larger than the outer radial width W3. The inner radial width W2 is larger than the outer radial width W3. However, the outer circumferential length L3 can be equal to or smaller than the outer radial width W3 of the wheel body 40 if needed and/or desired. The radial length L1 can be equal to or smaller than the outer circumferential length L3 if needed and/or desired. The outer circumferential length L3 can be equal to or smaller than the inner circumferential length L2 if needed and/or desired. The radial length L1 can be equal to or smaller than the outer radial width W3 if needed and/or desired. The inner radial width W2 can be equal to or smaller the outer radial width W3 if needed and/or desired.

The outer circumferential length L3 can also be referred to as a circumferential length L3. A ratio of the radial length L1 to the circumferential length L3 is equal to or larger than 4. The ratio of the radial length L1 to the circumferential length L3 is preferably equal to or larger than 5. The ratio of the radial length L1 to the circumferential length L3 is preferably equal to or larger than 6. The ratio of the radial length L1 to the circumferential length L3 is preferably equal to or larger than 7. In the present embodiment, the ratio of the radial length L1 to the circumferential length L3 is 7.35. However, the ratio of the radial length L1 to the circumferential length L3 is not limited to the present embodiment and the above ranges. The ratio of the radial length L1 to the circumferential length L3 can be smaller than 4 if needed and/or desired. The circumferential length L3 can be defined at a position other than the radially outer end 46B of each of the plurality of openings 46 if needed and/or desired.

A first distance DS1 is defined between adjacent two ends of the plurality of radially inner ends 46A of the plurality of openings 46 in the circumferential direction D1. A second distance DS2 is defined between adjacent two ends of the plurality of radially outer ends 46B of the plurality of openings 46 in the circumferential direction D1. In the present embodiment, the second distance DS2 is larger than the first distance DSL. The first distance DS1 is larger than the inner circumferential length L2. The second distance DS2 is larger than the outer circumferential length L3. However, the second distance DS2 can be equal to or smaller than the first distance DS1 if needed and/or desired. The first distance DS1 can be equal to or smaller than the inner circumferential length L2 if needed and/or desired. The second distance DS2 can be equal to or smaller than the outer circumferential length L3 if needed and/or desired.

Figure 6:
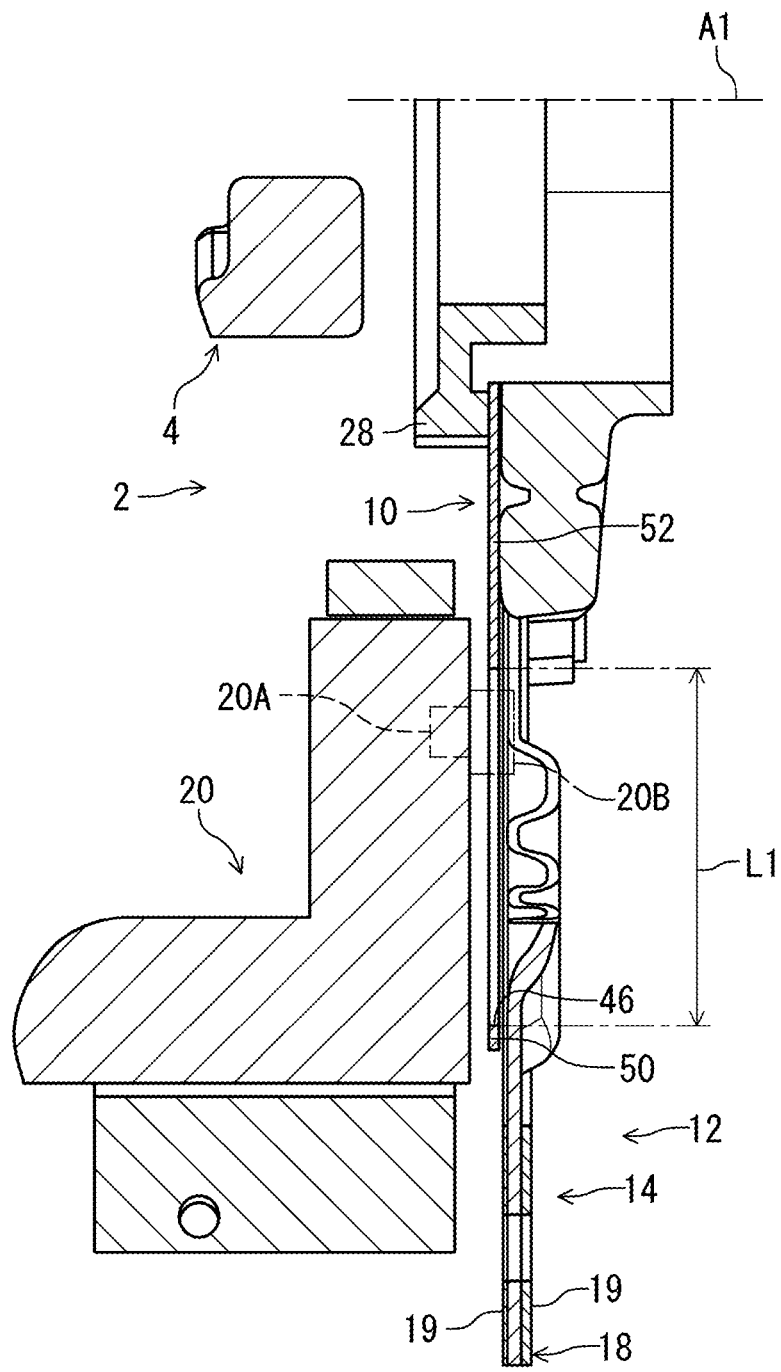
FIG. 6 is a cross-sectional view of the human-powered vehicle taken along line VI-VI of FIG. 1.

As seen in FIG. 6, the detector 20 is configured to detect passing of the plurality of openings 46. In the present embodiment, the detector 20 includes a magnetic sensor 20A. The magnetic sensor 20A has a sensing region 20B and is configured to detect a change in a magnetic field in the sensing region 20B. For example, the magnetic sensor 20A is configured to generate a voltage depending on a change in magnetic flux density of the magnetic field in the sensing region 20B. The magnetic sensor 20A include a sensing coil and a permanent magnet extending through the sensing coil. The permanent magnet is configured to generate the magnetic field. The sensing coil is configured to generate a voltage in response to a change in magnetic flux density of the magnetic field in the sensing region 20B. However, the magnetic sensor 20A can include other sensors such as a hall sensor.

The wheel body 40 is configured to influence magnetic flux density of the magnetic field generated by the permanent magnet of the magnetic sensor 20A. For example, the wheel body 40 is made of a material that influences magnetic flux density of the magnetic field. The disc brake rotor 14 is at least partly made of a material that does not influence magnetic flux density of the magnetic field. The openings 46 and the intermediate parts 48 are configured to change magnetic flux density of the magnetic field in the sensing region 20B when the sensor wheel 10 rotates.

The magnetic sensor 20A is configured to generate a change in a voltage when the openings 46 and the intermediate parts 48 pass through the sensing region 20B. Thus, the magnetic sensor 20A is configured to output the voltage that changes depending on transitions of the openings 46 and the intermediate parts 48 in the sensing region 20B. Accordingly, the detector 20 is configured to detect rotational information of the sensor wheel 10.

Figure 7:
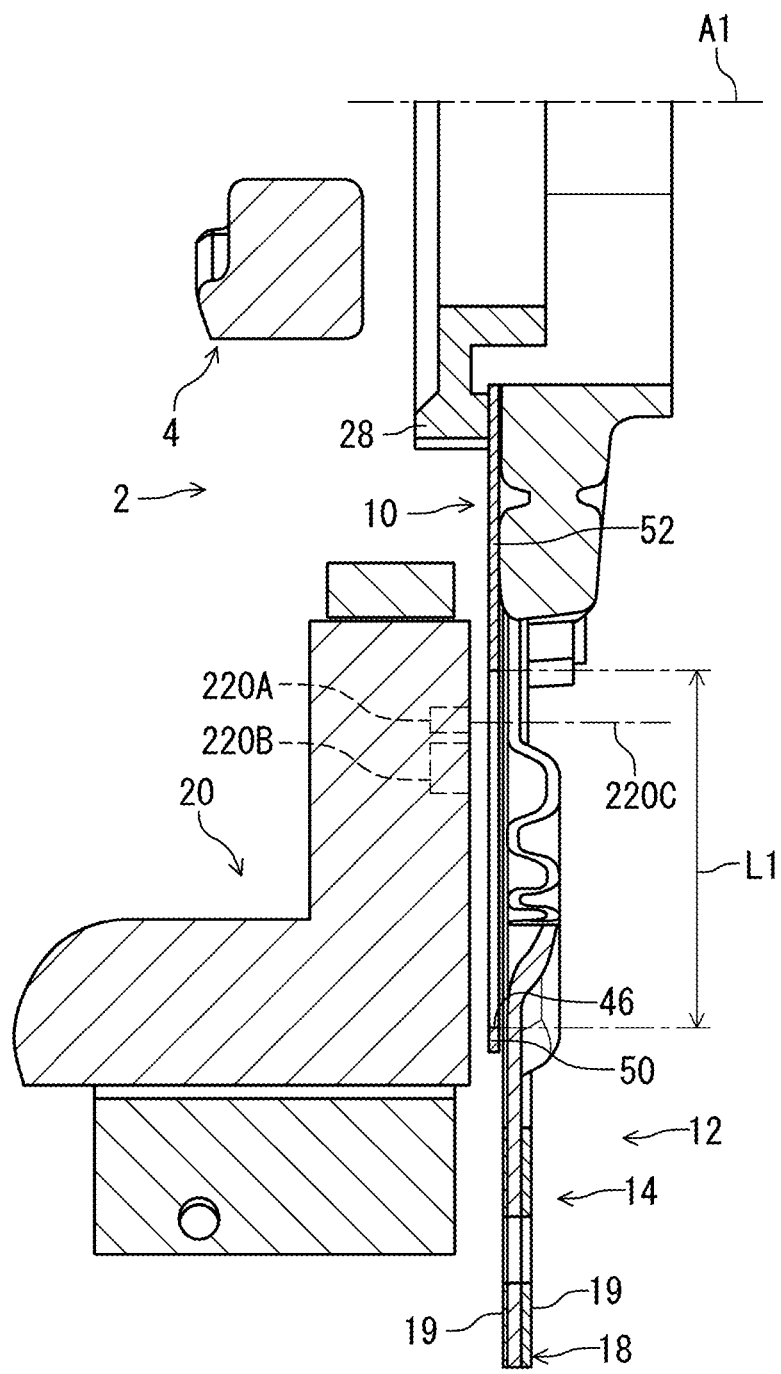
FIG. 7 is a cross-sectional view of a human-powered vehicle including a disc brake apparatus having a sensor wheel in accordance with a modification.

As seen in FIG. 7, however, the detector 20 can include other detectors such as an optical encoder. For example, the detector 20 includes a light emitter 220A and a light detector 220B. The light emitter 220A is configured to emit light to the sensor wheel 10. The light detector 220B is configured to detect light reflected by the sensor wheel 10 and is configured to generate signals in response to the receipt of the reflected light. The light emitted from the light emitter 220A passes through one of the plurality of openings 46 of the wheel body 40 when the one of the plurality of openings 46 is provided on a light path 220C through which light emitted from the detector 20 passes. Thus, the light detector 220B does not detect light reflected by the sensor wheel 10 when one of the plurality of openings 46 is provided on the light path 220C of the detector 20.

On the other hand, the light emitted from the light emitter 220A is reflected by one of the plurality of intermediate parts 48 of the wheel body 40 when the one of the plurality of intermediate parts 48 is provided on the light path 220C of the detector 20. Thus, the light detector 220B detects light reflected by one of the plurality of intermediate parts 48 when the one of the plurality of intermediate parts 48 is provided on the light path 220C of the detector 20. In other words, the detector 20 detects that the plurality of openings 46 passes through the light path 220C of the detector 20 in the circumferential direction D1.

With the sensor wheel 10, since the opening 46 has the radial length L1, it is possible to enlarge a radial area in which the detector 20 can be arranged to detect the rotation information of the sensor wheel 10. Thus, it is possible to improve flexibility with respect to a relative position between the sensor wheel 10 and the detector 20, enabling the sensor wheel 10 to be used for human-powered vehicles having different radial positions of the detector 20 with respect to the rotational axis A1.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A sensor wheel for a human-powered vehicle, comprising:
a wheel body configured to be rotatable relative to a vehicle body of the human-powered vehicle about a rotational axis along with a disc brake rotor of a disc brake apparatus of the human-powered vehicle, the wheel body including a plurality of openings spaced apart from each other in a circumferential direction with respect to the rotational axis; and
an attachment part configured to be operatively coupled to a rotational hub of the human-powered vehicle,
at least one opening of the plurality of openings having a radial length defined radially with respect to the rotational axis, the disc brake rotor including a friction surface configured to be in contact with a brake pad of a disc brake caliper of the disc brake apparatus, the radial length being larger than a radial width of the friction surface defined radially with respect to the rotational axis.

2. The sensor wheel according to claim 1, wherein the radial length is equal to or larger than 8 mm.

3. A sensor wheel for a human-powered vehicle, comprising:
a wheel body configured to be rotatable relative to a vehicle body of the human-powered vehicle about a rotational axis along with a rotational hub of the human-powered vehicle, the wheel body including a plurality of openings spaced apart from each other in a circumferential direction with respect to the rotational axis; and
an attachment part configured to be operatively coupled to the rotational hub,
at least one opening of the plurality of openings having a radial length defined radially with respect to the rotational axis, the at least one opening of the plurality of openings having a circumferential length defined in the circumferential direction, a ratio of the radial length to the circumferential length being equal to or larger than 4, wherein
the circumferential length is an inner circumferential length defined at a radially inner end of the at least one opening of the plurality of openings,
the at least one opening of the plurality of openings has an outer circumferential length defined in the circumferential direction at a radially outer end of the at least one opening of the plurality of openings, and
the outer circumferential length is larger than the inner circumferential length.

4. The sensor wheel according to claim 3, wherein the radial length is equal to or larger than 8 mm.

5. The sensor wheel according to claim 3, wherein
the wheel body is configured to be rotatable about the rotational axis along with a disc brake rotor of a disc brake apparatus of the human-powered vehicle,
the disc brake rotor includes a friction surface configured to be in contact with a brake pad of a disc brake caliper of the disc brake apparatus, and
the radial length is larger than a radial width of the friction surface defined radially with respect to the rotational axis.

6. The sensor wheel according to claim 3, wherein the ratio of the radial length to the circumferential length is equal to or larger than 6.

7. A disc brake apparatus for a human-powered vehicle, comprising:
a disc brake rotor; and
a sensor wheel comprising:
a wheel body configured to be rotatable relative to a vehicle body of the human-powered vehicle about a rotational axis along with a rotational hub of the human-powered vehicle, the wheel body including a plurality of openings spaced apart from each other in a circumferential direction with respect to the rotational axis; and
an attachment part configured to be operatively coupled to the rotational hub,
at least one opening of the plurality of openings having a radial length defined radially with respect to the rotational axis, the radial length being equal to or larger than 8 mm, wherein
the disc brake rotor includes an internal engagement structure configured to be operatively directly coupled to the rotational hub separately from the attachment part of the sensor wheel, and
the attachment part is configured to be operatively directly coupled to the rotational hub at a location overlapping and directly adjacent to a location at which the internal engagement structure is configured to be operatively directly coupled to the rotational hub when viewed in direction parallel to the rotational axis.

8. The disc brake apparatus according to claim 7, wherein the radial length is equal to or larger than 12 mm.

9. The disc brake apparatus according to claim 7, wherein the radial length is equal to or larger than 15.5 mm.

10. The disc brake apparatus according to claim 7, wherein
the at least one opening of the plurality of openings has an elongated shape extending radially with respect to the rotational axis as viewed along the rotational axis.

11. The disc brake apparatus according to claim 7, wherein
the at least one opening of the plurality of openings has a longitudinal axis extending radially with respect to the rotational axis as viewed along the rotational axis.

12. The disc brake apparatus according to claim 11, wherein
the longitudinal axis of the at least one opening of the plurality of openings extends radially outwardly from the rotational axis as viewed along the rotational axis.

13. The disc brake apparatus according to claim 11, wherein
the radial length is defined along the longitudinal axis.

14. The disc brake apparatus according to claim 7, wherein
the wheel body has an annular shape and includes an inner periphery, and
the attachment part is provided to the inner periphery of the wheel body.

15. The disc brake apparatus according to claim 7, wherein
the attachment part has a concavo-convex shape configured to be engaged with the rotational hub.

16. The disc brake apparatus according to claim 7, wherein
the wheel body includes an outer periphery,
the wheel body has an outer radial width defined radially from the outer periphery of the wheel body to the at least one opening of the plurality of openings,
the at least one opening of the plurality of openings has an outer circumferential length defined in the circumferential direction at a radially outer end of the at least one opening of the plurality of openings, and the outer circumferential length is larger than the outer radial width of the wheel body.

17. The disc brake apparatus according to claim 7, wherein the wheel body has a radius radially defined from the rotational axis to an outer periphery of the wheel body, and a ratio of the radial length to the radius of the wheel body is equal to or larger than 0.2.

18. The disc brake apparatus according to claim 7, further comprising:

a detector configured to detect passing of the plurality of openings.

* * * * *